Feb. 18, 1941.   G. STEINGRUBER   2,232,492
ELECTRIC HEATER
Filed Feb. 3, 1940   5 Sheets-Sheet 1
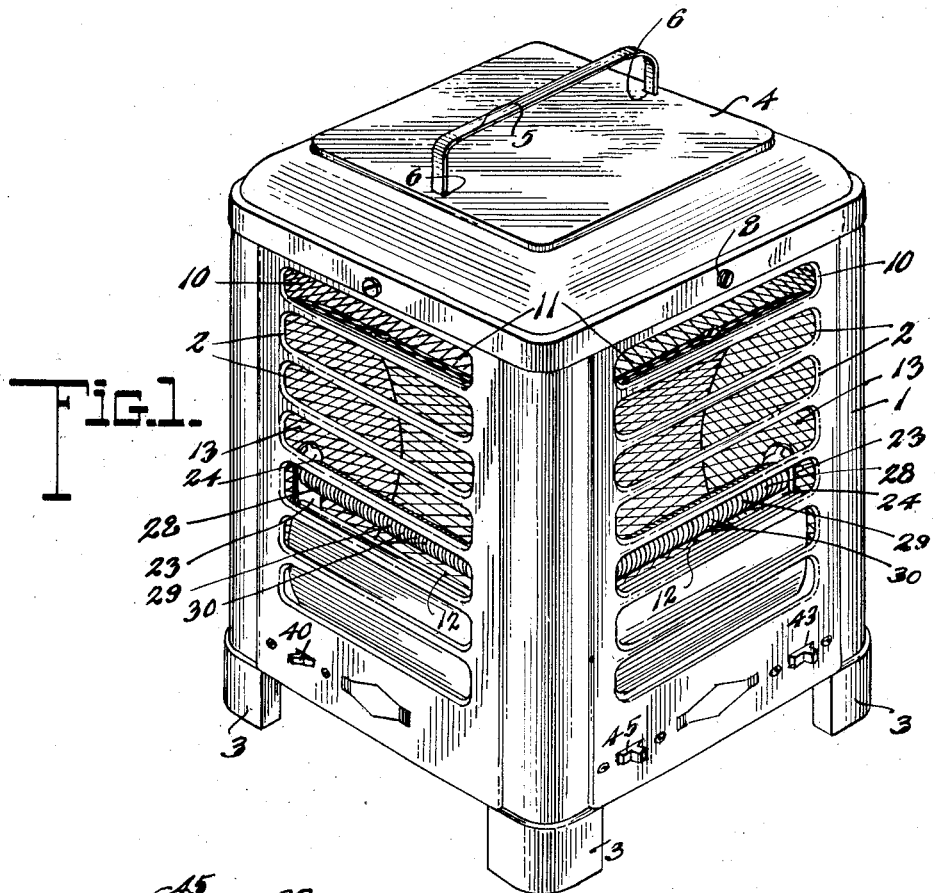
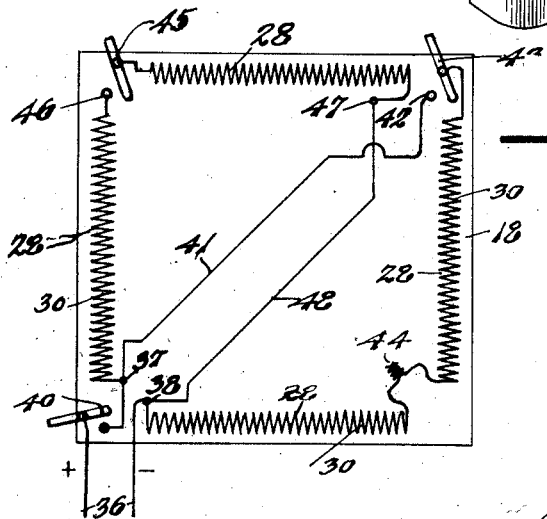
Inventor
G. Steingruber
By Robb & Robb
Attorneys

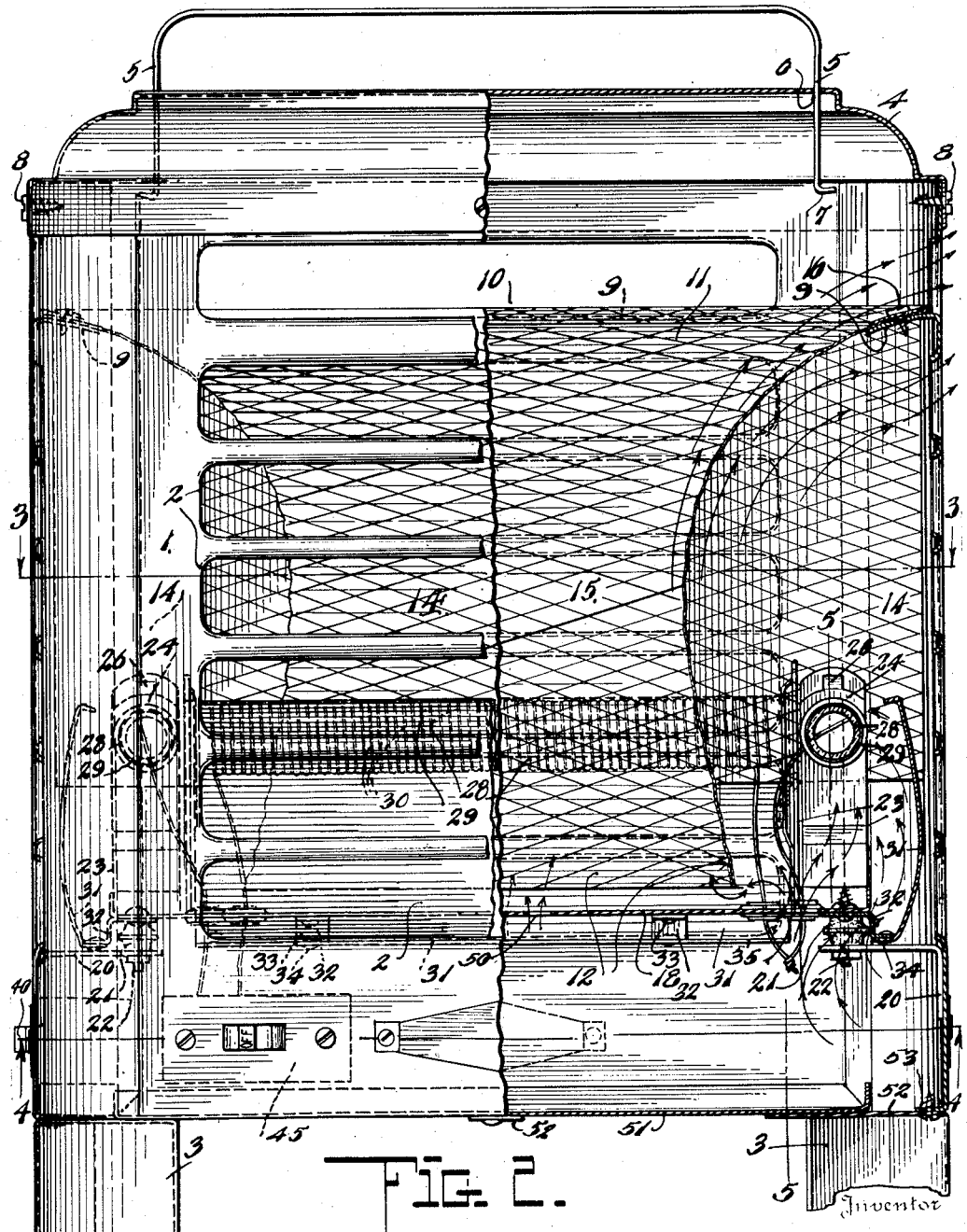

Feb. 18, 1941.  G. STEINGRUBER  2,232,492
ELECTRIC HEATER
Filed Feb. 3, 1940  5 Sheets-Sheet 3

Inventor
G. Steingruber
By Robb & Robb
Attorneys

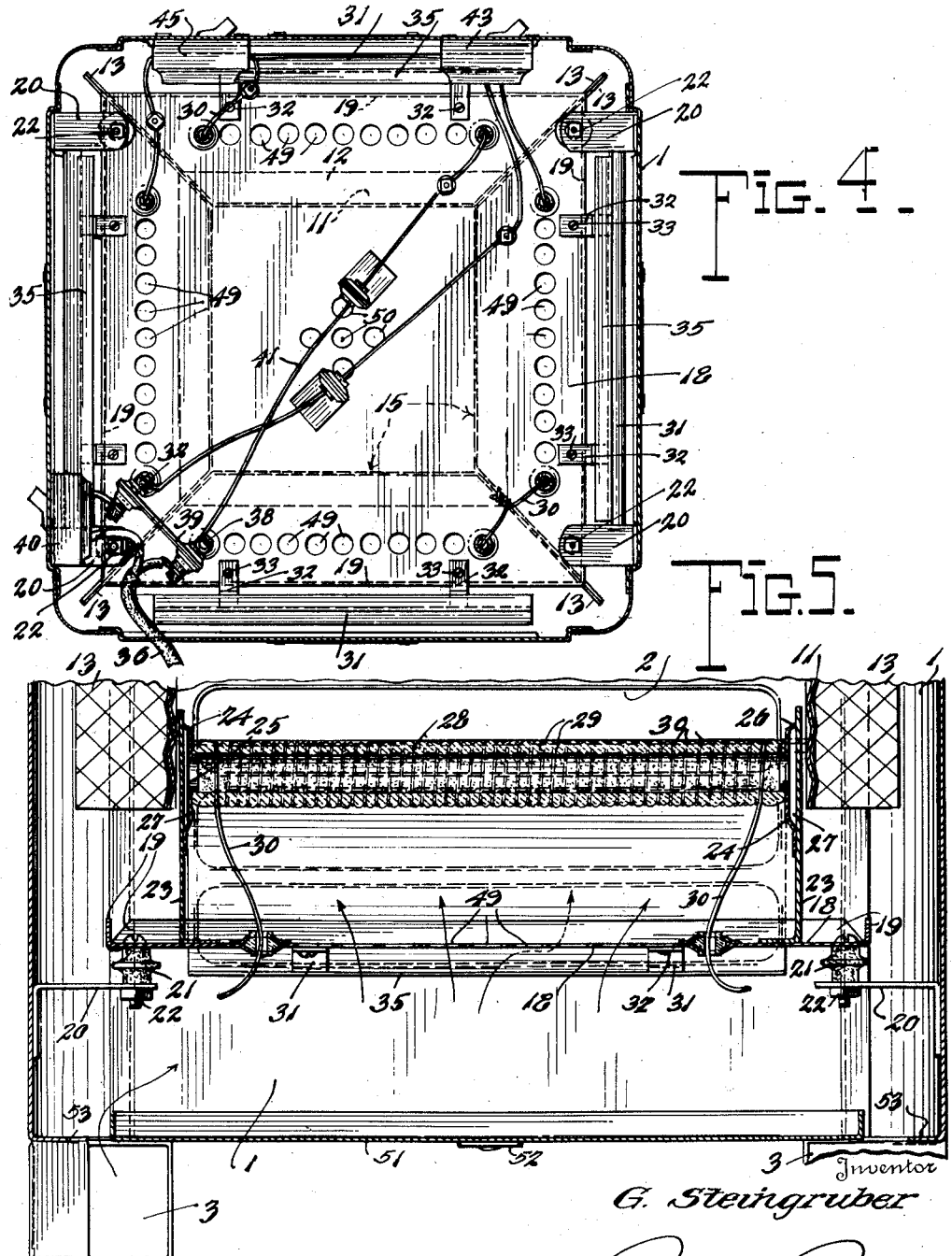

Feb. 18, 1941.   G. STEINGRUBER   2,232,492
ELECTRIC HEATER
Filed Feb. 3, 1940   5 Sheets-Sheet 5
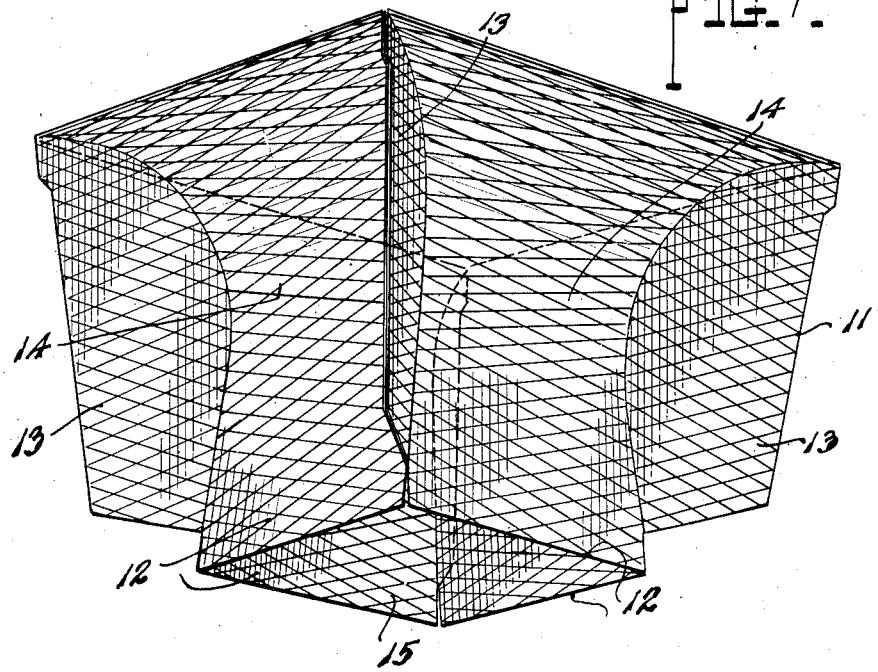
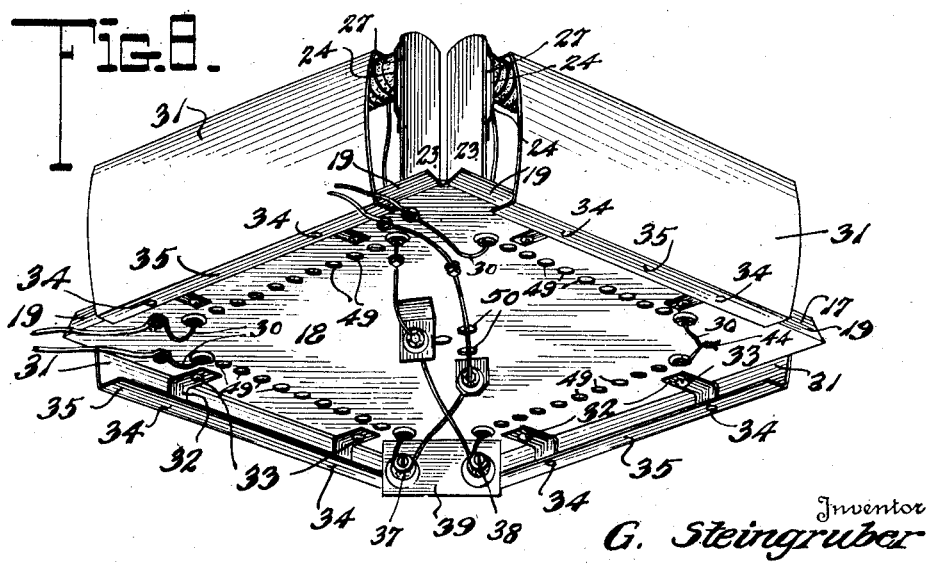
Inventor
G. Steingruber
By Robt H Robb
Attorneys Patented Feb. 18, 1941

2,232,492

UNITED STATES PATENT OFFICE 2,232,492

ELECTRIC HEATER

George Steingruber, Shelbyville, Tenn.

Application February 3, 1940, Serial No. 317,188

7 Claims. (Cl. 219—34)

This invention appertains to electric space heaters, and more especially to an improved heater construction having a relatively high heating capacity and suitable for use as a central heater for dwellings, office buildings, factories, stores, and other commercial establishments having one or more large rooms or a plurality of rooms of ordinary size arranged on one or more levels.

I am aware that it is not broadly new to provide a plurality of heating elements or sources of heat in a single heater, but I have devised a novel arrangement of heating elements and associated heat reflecting and radiating surfaces by which I am able to obtain a substantially uniform distribution and diffusion of heat in all directions with a minimum consumption of energy or power. The efficiency and economy of operation of my new space heater are materially higher than are normally found in heaters of this general class, this being largely due to the employment of a combination of reflected, radiated and circulated heat in such a way that each is effective in all directions. The novel arrangement of the reflecting and radiating surfaces in my heater which constitutes the present invention, further plays an important part in the attainment of an unusually highly efficient flow of air through the heater and attendant circulation of heat.

My new heater readily lends itself to a construction suitable for use as a permanent and fixed installation, or it may be made in the form of a portable unit as illustrated in the accompanying drawings, in which latter form the heater can be conveniently moved about from one location to another as occasion or circumstances require.

In carrying out the aforementioned aims and objects of my invention, particular attention has been given to the provision of a heater construction which is simple and composed of comparatively few and inexpensive parts and which may be easily and quickly assembled. These features, together with the compact form of the heater, make it especially advantageous from a low cost production point of view. The low cost of electrical power which prevails in certain sections of the country and the trend toward reduction of power rates in other sections has created an increased demand for a practical low priced heater which my new heater eminently fills. In the average case, especially in locations where the climate is temperate, my heater will in itself afford sufficient heat to the exclusion of other heating systems, but of course it may be employed as an auxiliary source of heat.

In the preferred form of my invention, my heater is composed of a plurality of unitary parts which facilitates the assembly of the heater. Essentially, these unitary parts comprise an outer casing, a reflector shell, and a heating element assembly, the reflector shell forming a plurality of heating chambers at its outer sides in each or certain of which there is located a heating element, and a central flue or chamber which serves to create a chimney effect for circulating air upwardly through the central part of the heater and discharging the air in a heated condition laterally through outlets provided in the casing walls.

Another object of the invention is to provide a portable light-weight electric space heater embodying a plurality of heating elements arranged in association with heat reflecting and radiating surfaces which also function as air directing and controlling means by which the air is "soaked" with heat and the heat is reflected, radiated, and circulated to discharge laterally in a plurality of directions, about a common vertical axis.

A still further object of the invention is to provide a heater of the character described in the preceding paragraph, wherein provision is made for selectively controlling the heating elements so that the heat discharged from the heater may be substantially confined to predetermined directions and discontinued in other directions.

Other and further objects and advantages of the invention will be hereinafter described, and the novel features thereof defined by the appended claims.

In the drawings:

Figure 1 is a perspective view of an electric space heater constructed in accordance with my invention;

Figure 2 is a view of the heater in side elevation, the right-hand portion thereof being broken away and the parts shown in vertical section;

Figure 4 is a horizontal section taken approximately on the line 4—4 of Figure 2 looking in an upward direction;

Figure 5 is a fragmentary vertical sectional view taken approximately on the plane of line 5—5 of Figure 2;

Figure 6 is a diagrammatic view of the electrical heating elements and associated circuits and controls as observed in bottom plan;

Figure 7 is a perspective view of the reflector unit or shell; and

Figure 8 is a perspective view of the heating element assembly or unit.

Figure 3:
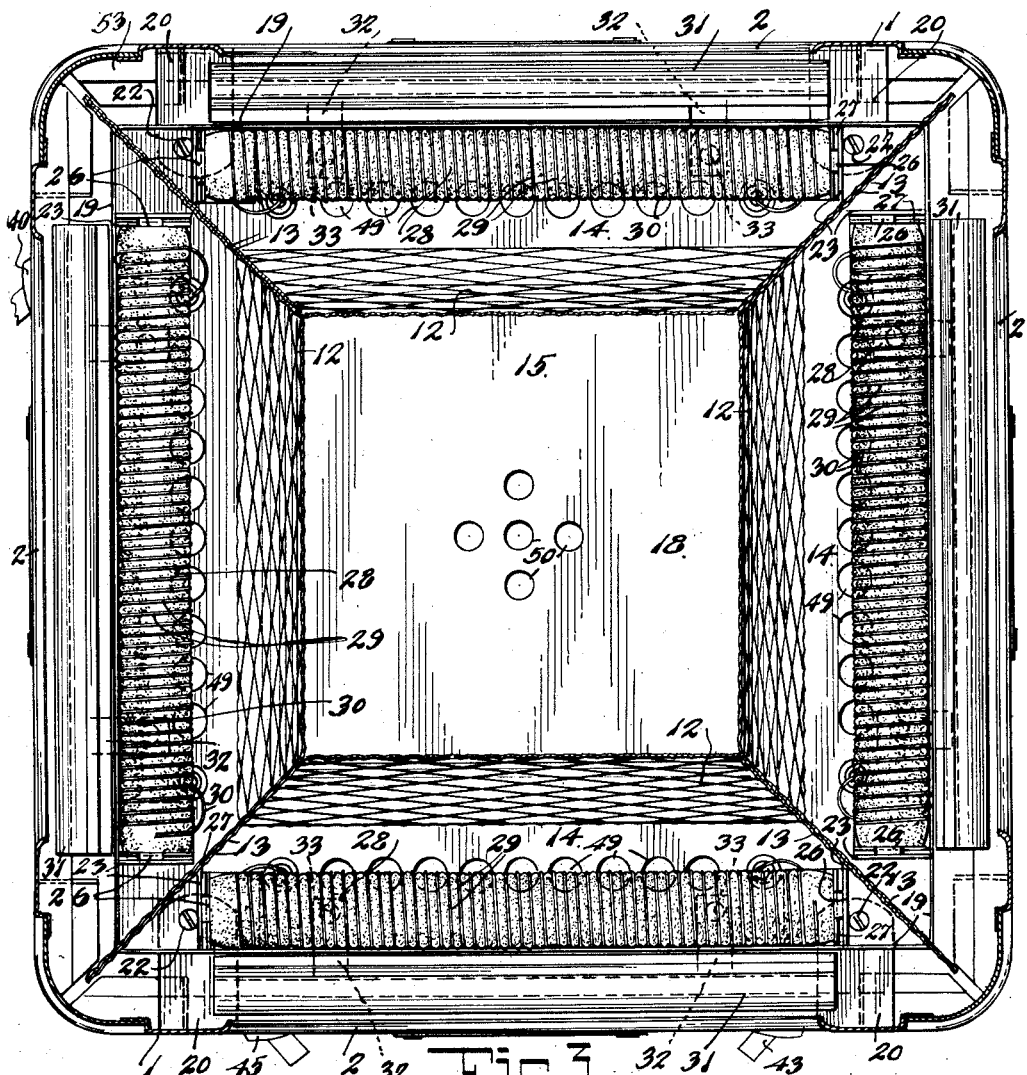
Figure 3 is a horizontal sectional view taken approximately on the plane of line 3—3 of Figure 2 looking in a downward direction.

Like reference characters designate corresponding parts in the several figures of the drawings, wherein 1 generally denotes the outer shell or casing of the heater which is preferably constructed of sheet metal, providing a plurality of vertical adjoining side walls having grill-like openings 2 formed therein. While the heater shell illustrated in the drawings is in the form of a generally rectangular structure having four side walls, it is to be understood that the same may be modified to provide a greater or lesser number of walls, as will hereinafter more fully appear. In other words, the casing may be cylindrical in horizontal cross section, or it may have three or more adjoining sides arranged about a common vertical axis, the wall or walls being suitably apertured to permit the directing of the heat laterally in substantially all directions respecting the vertical axis. I have found, however, that a four-sided shell is quite satisfactory for general purposes, and the following description will accordingly be directed to such a construction.

Attached to each lower corner of the shell is a leg member or support 3, which may also be formed of sheet metal if desired, to elevate the lower end of the shell or casing a suitable distance above the supporting surface upon which the heater is disposed when in use, thus enabling air to freely enter the bottom of the casing or shell 1 which is open at its bottom for this purpose. The walls of the casing 1 and the legs 3 may be made from simple metal stampings and secured together in any suitable manner, preferably by means of welding. Removably mounted upon the upper end of the casing 1 is a top or cover 4 having a bail-like handle 5 extending downwardly at its opposite ends through slots 6 formed therein, the lower extremities of the handle 5 being bent laterally, as at 7, to engage the under side of the top or cover 4 and thus prevent complete displacement of the handle from the cover when the handle is lifted upwardly. When not in use, the handle may be moved downwardly through the slots 6 to a position in which the transverse portion of the handle lies relatively close to the upper surface of the cover 4, this position facilitating packaging or storage of the heater in a space of minimum size. Screws 8, or other removable fastening means, are preferably employed to secure the cover 4 to the upper ends of the side walls of the casing 1.

Near the upper end of each of the side walls of the casing a portion of the metal is pressed out to provide a laterally inwardly projecting flange 9, leaving an opening 10 above the grill openings 2, the opening 10 constituting a hot-air discharge opening, as will hereinafter more fully appear. The flanges 9 serve to support a reflector shell generally designated 11, which is best shown in Figure 7, the reflector shell preferably having the form of a unitary structure. The reflector shell comprises a plurality of adjoining side walls 12, each of which is curved inwardly from its upper edge to a point about midway between the upper and lower edges, and thence extending downwardly in a substantially vertical direction or curving slightly outwardly, as will be best understood from reference to Figure 2. At each adjoining corner of the side walls 12 there is provided a wing 13 which extends diagonally downwardly from the corner. Each pair of wings 13, 13, together with an intermediate side wall 12, forms what may be generally termed a concave heating chamber 14 facing in an outward direction. Thus, the reflector unit forms a plurality of adjoining heating chambers arranged about a common axis. The side walls 12 of the reflector unit 11 are spaced from the central axis of the unit and form a central flue 15 extending vertically through the unit from top to bottom. The reflector shell or unit 11 is suspended co-axially in the outer shell or casing 1 by engagement of the upper ends of the side walls 12 of the reflector unit with the flanges 9 previously described. Screws 16, or other removable fastening instrumentalities, may be used to securely attach the reflector unit 11 to the casing 1. In the assembled position of the reflector shell in the casing 1, the diagonal wings or panels 13 project outwardly substantially to the corners of the casing 1, as will be best seen in Figures 3 and 5, thereby restraining the reflector unit against displacement about the vertical axis relative to the casing 1. When so positioned, the respective heating chambers 14 of the reflector unit will lie opposite the respective side walls of the casing 1, facing the openings 2 in the walls of the latter, so that the heat developed within the chambers 14 will be directed outwardly through the openings 2 in the casing 1. The lower end of the reflector shell terminates somewhat above the bottom of the casing 1. Air entering the bottom of the casing 1 will, accordingly, freely pass upwardly into the central flue 15 of the reflector unit 11, and ultimately the air passes outwardly through the openings 10 in the respective side walls of the casing 1, at the upper end of the reflector shell.

Referring now to Figures 3, 5, and 8, 17 generally denotes a heating element assembly or unit which comprises a base or frame 18 having the form of a plate which is adapted to be horizontally disposed across the lower end of the casing or shell 1. The area of this plate 18 or base is somewhat less than the cross sectional area of the space embraced within the side walls of the casing 1, so that the marginal edges of the plate 18 will be spaced from the side walls of the casing, thus permitting air to flow upwardly between the walls of the casing 1 and the outer edges of the plate 18. The marginal edges of the plate 18 are preferably provided with upwardly turned flanges 19 to stiffen the same. The plate 18 may be mounted in the casing 1 in any suitable manner, the mounting being preferably of a type which permits convenient removal of the plate. One simple form of mounting, as illustrated in the drawings, comprises a pair of angle brackets 20 welded or otherwise fixedly attached to opposite side walls of the casing 1, and having arms extending inwardly of the casing beneath opposite edges of the plate 18. Porcelain or other suitable insulating means 21 are preferably interposed between the supporting arms of the brackets 20 and the plate 18, and attaching bolts 22 extend through the plate 18, the porcelain insulators 21, and the supporting arms of the respective brackets 20, thus rigidly securing the plate 18 in position within the casing 1.

At each edge of the plate or base member 18, which is rectangular in the case of a rectangular heater of the four-sided type shown in the drawings, there is provided a pair of standards 23, 23, the lower ends of which are welded or otherwise fixedly secured to the plate 18, and the standards extending vertically upwardly from the plate 18, as best shown in Figures 5 and 8. The standards of each pair are spaced from each other and positioned near opposite corners of the plate 18, and the standards are preferably of such width and thickness as to be substantially rigid. Attached to the inside of each standard 23 is a relatively thin flexible plate 24 having a boss or lug 25 projecting toward the corresponding plate 24 of the opposed standard 23 of the same pair. These flexible plates 24 are secured to their respective standards 23 at their lower ends, so that their upper ends are free to move towards and away from the standards. The upper extremity of each flexible plate 24 is provided with a tongue 26 which is bent laterally towards its contiguous standard 23, which is adapted to yieldingly bear against the latter. It will be noted from Figure 5 that each flexible plate 24 is spaced somewhat from its standard 23, as indicated at 27, between the tongue 26 and the lower portion of the plate which is attached to the standard.

Mounted between each pair of flexible plates 24 is an electrical heating element generally designated 28. The heating elements 28 are preferably composed of elongated refractory tubes 29 about which is helically wound an electrical resistance wire or ribbon 30, which may be of any conventional type normally employed for electrical heaters. The heating elements are each disposed in a substantially horizontal position, with the opposite open ends of the refractory tubes 29 engaged over the lugs or bosses 25 carried by the flexible plates 24. By this arrangement, the heating elements may be conveniently assembled and removed for replacement, and, when assembled, the heating elements will be yieldably supported in such a way as to minimize damage which might otherwise occur as a result of jars or shocks imposed thereon in shipping or moving the heater about from place to place. The flexible plates 24 of each opposing pair of standards 23, 23 will exert a firm or yieldable endwise pressure upon each heating element 28. While the standards 23 themselves are more or less rigid, they will of course be yieldable to some extent, thus supplementing or augmenting the yieldable pressure exerted on the ends of the heating elements 28 by the flexible plates 24.

As clearly shown in the drawings, the heating elements 28 are supported in a horizontal position in spaced relation to and above the base plate 18, and when the heating unit, as a whole, is assembled in the casing 1 as previously described, there will be one heating element 28 disposed transversely in each of the heating chambers 14 formed by the reflector unit or shell 11. It is to be particularly noted that the lower end of the reflector unit or shell 11 is also spaced somewhat above the base plate 18 of the heating unit or assembly 17, the purpose of which will be more fully described in the description of the operation of the invention. Moreover, the heating elements 28 are themselves located in the respective heating chambers 14 at a distance somewhat above the extreme bottoms of these chambers.

As a further aid to the resistance of displacement of the reflector unit 11 respecting the casing 1, the lower ends of the wing members 13 of the reflector unit are received between the contiguous standards 23 of each adjacent pair of standards, as is clearly shown in Figure 3. Such an arrangement also prevents warpage of the wing members 13, and otherwise contributes to the rigidifying of the heater assembly.

As best shown in Figures 2, 3 and 8, there is attached to each edge of the base plate 18 a reflector plate 31, which extends upwardly therefrom in outwardly spaced relation to the corresponding heating element 28 which is also mounted adjacent to the edge of the base plate. The upper edges of the plates 31 terminate about on a level with the heating elements 28, and the plates 31 may thus be considered as a continuation of the walls of the respective heating chambers 14 at the front of the latter. The attachment of the plates 31 to the base plate 18 may be effected in any suitable manner, as, for instance, by means of brackets 32 of approximate Z shape, the upper arms of the brackets being secured to the base plate 18, as at 33, and the lower arms of the brackets being attached, as at 34, to a laterally inwardly turned flange 35 on the lower edge of the plate 31. This arrangement disposes the lower edge of each plate 31 below the base plate 18, and spaces the plate 31 from the base plate 18 so that air may freely pass upwardly therebetween from a point below the base plate 18.

The reflector unit 11 and the plates 31 are preferably composed of sheet metal having a high polish for having a suitable light and heat reflecting material applied onto the metal surfaces. Chromium-plated metal plates are especially useful for the construction of these elements, since the chromium plating is a highly efficient light and heat reflector, and will not tarnish readily.

Referring particularly to Figure 6, the heating elements 28 are diagrammatically illustrated in a circuit arrangement which I have found to be quite useful and desirable from a practical standpoint. It is to be understood, however, that the circuit may be modified, if preferred, and depending upon the nature of the power source which may be available in different places where the invention is to be used. According to the diagram, 36 represents the feed lines or conductors by which the heater may be connected to any convenient source of electrical power, such as a 220-volt A. C. or D. C. power system. For a power system of this type, the heating elements 28 are preferably arranged in series circuits, each circuit containing two heating elements 28, and the separate series circuits being preferably provided with controls so that they may be energized independently of one another, as well as used simultaneously. According to the arrangement shown in Figure 6, the conductors 36 are connected to the respective terminals 37 and 38, which are carried by a terminal panel 39 or support secured to the bottom of the base plate 18 of the heater assembly 17. A control switch 40 is interposed in one of the conductors 36 to enable the current to be turned off and turned on at will. This switch 40 will, for convenience, be termed the master switch, because it is the main switch which controls the energization of the heater irrespective of the number of heating elements 28 which are in use, or are to be operated.

Connected to one of the terminals, for example, terminal 37, is a conductor 41 which leads to a contact 42 of an auxiliary switch 43, which auxiliary switch 43 is interposed between the terminal 37 and heating element 28 which is disposed at the right hand side of the view shown in Figure 6. This heating element is connected in series with the heating element 28 at the bottom of the view, as indicated by the connection 44 between the adjacent ends of the heating elements. The left-hand end of the heating element at the bottom of the view, Figure 6, is connected with the other terminal, in this instance 38, to which one of the feed wires or conductors 36 is connected. Accordingly, when the master switch 40 is closed, the current will flow from one of the feed conductors 36 to the terminal 37, and from the terminal 37 through the conductor 41 and through the switch 43, when closed, to the heating elements 28, 28 connected in series at 44, back to the terminal 38, and back through the other feed conductor 36 which has been indicated on the drawings by the negative symbol.

A generally similar circuit arrangement is provided in the case of the other heating elements 28, 28 located at the top and left-hand sides respectively of the view, Figure 6. This latter circuit includes a second auxiliary switch 45 and contact 46 interposed between the adjacent ends of the heating elements 28, 28 of this circuit. Tracing the circuit through, and assuming that the auxiliary switch 45 and master switch 40 are closed, the current flows from one of the feed conductors 36, say the one indicated by the positive symbol, through the master switch 40 to the terminal 37, and then through the heating element 28 at the left-hand side of Figure 6, through the auxiliary switch 45, and then through the heating element 28 at the top of the view, to the terminal 47 which is connected by a conductor 48 to the terminal 38, and then back to the other feed wire 36 which is represented by the negative symbol.

It will be understood from the foregoing that when the master switch 40 is closed and both of the auxiliary switches 43 and 45 are closed, both of the respective circuits containing the two heating elements 28, 28 in series will be energized simultaneously, and will be arranged in parallel across the main feed lines or conductors 36. By simply opening one or the other of the auxiliary switches 43, 45, one or the other of the series circuits containing the heating elements 28, 28 may be disconnected or interrupted. This is of particular advantage when it is desired to have the heater develop less heat than that produced when operating at its maximum capacity; but more especially it admits of the location of the heater in a position relatively close to a wall or some other object without causing the wall or object to be scorched, burned, or otherwise damaged by the heat. For example, it may sometimes be desired to move the heater to a position near or close to the corner of a room formed by two adjacent wall surfaces, so that the heater will be out of the way. This would be dangerous if all of the heating elements were operating. By actuating one of the switches 43 or 45 to its "off" position to deenergize the two heating elements 28, 28, which would be next to the walls of the room under such a condition, the heat is substantially discontinued in the direction of these room walls, leaving the other two heating elements 28, 28 effective for heating the room at the sides of the heater which are disposed outwardly of the room.

As clearly shown in Figure 8, the wiring between the heating elements 28 and the terminals 37, 38 on the bracket or terminal panel 39, and the connections between the heating elements and the switches are freely run below the base plate 18 of the heating unit assembly 17. Wherever such wiring passes through the base plate 18, there is preferably provided a porcelain or other insulating sleeve to maintain the wiring insulated from the metal parts of the heater. As also clearly shown in this same figure, the base plate 18 is provided with a series of apertures 49 arranged directly below each of the heating elements 28, so that air may freely pass therethrough in an upward direction for direct contact with the heating elements 28. At the center of the base plate 18 is another aperture or plurality of apertures 50 by means of which air is free to pass upwardly therethrough to the central flue 15 of the reflector unit 11.

In order to prevent accidental shortcircuiting of the wiring beneath the base plate 18 of the heater unit assembly 17, and to prevent rugs or other objects from inadvertently contacting the relatively hot parts of the heater at the bottom thereof, as well as preventing undue radiation of heat in a downward direction towards floor coverings or other supporting surfaces upon which the heater is placed, I preferably provide a baffle plate 51 which is mounted across the bottom of the outer casing or shell 1. This baffle plate is preferably flanged around its marginal edges to stiffen the same, and its area is somewhat less than the cross sectional area embraced within the side walls of the casing 1. The baffle plate 51 may be conveniently attached to the casing by means of lateral plates 52 which are secured to the bottom of the baffle plate, as by welding, and project laterally beneath the inwardly-turned flanges 53 formed on the lower ends of the side walls of the casing 1, the outer extremities of the plates 52 being preferably removably attached to these flanges 53. When so mounted, the baffle plate 51 will be substantially equally spaced at its sides from the side walls of the casing 1, allowing air to freely pass upwardly through such space for subsequent entrainment of heat in its passage through the heater and over the heating elements.

The walls of the reflector shell 11 are preferably constructed so that the heat radiated and reflected therefrom will be diffused substantially uniformly. To this end, the sheet metal of which the reflector walls are preferably made may be provided with diagonal intersecting grooves, as indicated by the intersecting lines in Figure 7. These grooves may be rolled, stamped, or otherwise formed in the metal, leaving diamond-shaped areas therebetween, and producing a more or less embossed surface. I have found that such a surface is unusually efficient in its heat diffusing properties.

It will be understood that instead of employing two auxiliary switches 43 and 45, only one such switch may be used, if preferred. Under such a condition, a little more care must be exercised in placing the heater near other objects or in the corner of a room so that the heating elements which are controlled by the single auxiliary switch are the ones which are closest to the objects or walls. By actuating the master switch 40 to its "off" position, all of the heating elements will be deenergized, and when it is actuated to its "on" position, only two of the heating elements will be energized when the auxiliary switch is in its "off" position. By turning the auxiliary switch to its "on" position, all of the heating elements will be energized. Other modifications in the electrical circuit will be obvious to those skilled in the art, such as the application of automatic or thermostatic controls to automatically regulate the heat as by cutting out one or all of the heating element circuits when the temperature of the room rises above a predetermined limit, and reconnecting the heating elements to the supply line when the temperature falls below a predetermined limit.

It is also comprehended by the invention that it is not necessary that there be a heating element, such as 28, in each of the heater chambers 14. If preferred, the heating elements may be omitted from certain of the heating chambers, and the heat which would be produced in these chambers would be derived primarily from radiation of heat from the chamber walls, which are more or less in thermal contact with the walls of the other heating chambers. In addition, the air circulated through these heater chambers will entrain heat as the air contacts with the chamber walls, regardless of whether there is a heating element in the particular chamber or not.

Having described in the foregoing the details of my new heater, I shall pass now to a description of the operation of the same, having particular reference to Figures 2 and 5. Assuming the heating elements 28, or at least certain of them, are energized, heat will be reflected outwardly of the heating chambers 14 through the openings 2 in the side walls of the outer casing or shell 1. The reflected heat is supplemented by the heat radiated from the walls of the reflector shell 11. In addition to the reflected and radiated heat, the heat will be further increased by the induction of a strong flow of air upwardly through the heater. This air enters the open bottom of the outer casing or shell 1, passing around the marginal edges of the baffle plate 51, and thence upwardly to the heating unit assembly 17 where the air divides. In dividing, a portion of the air passes through the central apertures 50 in the base plate 18 of the heating unit assembly, and thence directly into the central flue 15 of the reflector unit 11. Another portion of the air passes through the apertures 49 directly below the heating elements 28, and thence upwardly into contact with the heating elements, as clearly shown by the arrows in Figure 2. Some of this latter portion of air will pass between the lower extremity of the reflector shell 11 which is spaced slightly above the base plate 18, and into the central flue 15, as also shown by the arrows in Figure 2. Still another portion of the air will pass around the marginal edges of the base plate 18, through the space between the plate 18 and the plates 31, the air then rising upwardly into contact with the respective heating elements 28 and discharging through the openings 2 in the side walls of the casing 1 at the outer sides of the heating chambers 14. That portion of the air which enters the central flue 15 is quickly heated by contact with and radiation of the walls of the reflector shell, and is ultimately discharged through the openings 10 at the upper end of the casing 1. When all of the heating elements 28 are in operation, the heat will be distributed and diffused in all directions around the heater, whereas by manipulating the control switches previously described, the heat may be confined to certain directions only and substantially discontinued in other directions.

While the specific details of constructions have been herein shown and described, the invention is not confined thereto as changes and alterations may be made without departing from the spirit thereof as defined by the appended claims.

Having thus described my invention, what I claim as new and desire to secure by Letters Patent is:

1. A heater of the class described, comprising a multi-sided casing closed at its top and open at its bottom, each side wall having at least one opening therein, a reflector shell disposed within the casing, said reflector shell having a plurality of interconnected side walls forming adjoining concave chambers corresponding in number to the number of side walls of the casing and facing the respective openings in the latter, said walls of the reflector shell also forming behind the chambers a central air flue, said flue and chambers being in communication with the opening at the bottom of the casing, and the upper end of the flue communicating with the exterior of the heater through the casing, and heating elements mounted in certain of said chambers of the reflector shell.

2. A heater of the class described, comprising a plurality of heating chambers arranged about and spaced from a common vertical axis and forming an axially open central air flue, said chambers facing outwardly from the common axis aforesaid so that the heat will be directed laterally in all directions, heating means disposed in at least certain of the heating chambers, and each of said chambers having provision for admitting air into the same at the bottom thereof, each heating element including a plate at the outer side thereof extending upwardly for a substantial distance from the bottom of the chamber, and the heating means being arranged in their respective chambers below the upper edge of the plates aforesaid.

3. A heater of the class described, comprising a casing closed at its top and open at its bottom, means within the casing dividing the same into a plurality of adjoining heating chambers disposed about the vertical central axis of the casing and forming behind said chambers a central air flue, said chambers facing outwardly respecting the central axis and said casing having openings therein in register with the chambers, the upper end of said air flue being in communication with the exterior of the heater through the casing, and said flue and chambers also being in communication with the exterior of the heater through the bottom of the casing, said casing dividing and chamber forming means comprising a structural unit, said casing having laterally and inwardly directed flanges on its side walls near the upper end of the casing for engaging the upper end of the unit to support the latter, and heating means disposed in at least certain of the chambers.

4. A heater of the class described, comprising a casing closed at its top and open at its bottom, means within the casing dividing the same into a plurality of adjoining heating chambers disposed about the vertical central axis of the casing and forming behind said chambers a central air flue, said chambers facing outwardly respecting the central axis and said casing having openings therein in register with the chambers, the upper end of said air flue being in communication with the exterior of the heater through the casing, and said flue and chambers also being in communication with the exterior of the heater through the bottom of the casing, heating means disposed in at least certain of the chambers, and a common supporting base for said heating means disposed horizontally across the casing adjacent to the bottom thereof and attached to the latter with its marginal edges spaced from the casing.

5. A heater of the class described, comprising a casing closed at its top and open at its bottom, means within the casing dividing the same into a plurality of adjoining heating chambers disposed about the vertical central axis of the casing and forming behind said chambers a central air flue, said chambers facing outwardly respecting the central axis and said casing having openings therein in register with the chambers, the upper end of said air flue being in communication with the exterior of the heater through the casing, and said flue and chambers also being in communication with the exterior of the heater through the bottom of the casing, heating means disposed in at least certain of the chambers, and a common supporting base for said heating means disposed horizontally across the casing adjacent to the bottom thereof and attached to the latter with its marginal edges spaced from the casing, said supporting base having a plurality of plates carried thereby and projecting upwardly therefrom at the outer sides of the respective heating chambers and outwardly spaced from the heating elements, with the upper edges of the plates terminating at about the level of the heating elements.

6. A heater of the class described, comprising a multi-sided casing closed at its top and open at its bottom, each side wall having at least two horizontally elongated openings formed therein, one disposed below the other, said casing having inwardly projecting reflector supporting flanges extending horizontally below the upper openings in the side walls of the casing, a structural reflector unit disposed within the casing comprising a plurality of heating chambers corresponding in number to the number of sides of the casing, each chamber having an inwardly and downwardly curved side wall, the upper portion of said side wall being disposed on said supporting flange, said reflector unit having vertical division walls disposed between the chambers aforesaid and extending from the upper edge of the side reflector wall downwardly to a point near the bottom of the side wall, said reflector unit dividing said casing into a central flue passage open at its bottom and opening outwardly above each of the chambers through each of the upper horizontal openings in the sides of the casing and the chambers opening outwardly through the lower of said horizontal openings in the side walls of the casing, a heating element disposed in each of said reflector chambers between the side walls of the chambers and corresponding sides of the casing, and a second reflector plate in each of the chambers supported by the casing and positioned between the heating element and the side of the casing, said plate extending across the chamber beyond the ends of the lower horizontal opening from a point about on the level with the heating element to a point substantially below said heating element.

7. In a heater of the class described, a casing having a closed top, an open bottom and side walls, at least one of said side walls having two or more horizontally disposed elongated openings formed therein, one above the other, a reflector unit comprising a curved side wall engaging the casing just below the upper most opening aforesaid and curving inwardly and downwardly to a point below the openings, dividing said casing into at least two heating chambers one behind and above the other with the upper respective ends of the chambers in communication with the horizontal openings aforesaid, a supplemental reflector supporting plate disposed across the open bottom portion of the casing below and spaced from the bottom edge of the reflector side wall and secured to the casing with its edges spaced from the sides of the casing to form air inlet openings, a reflector plate carried by said supporting plate and extending upwardly from near the bottom of the side wall in front of the lower portion of the side wall of the reflector unit, and an elongated heating element disposed between the reflector unit side wall and said reflector plate about on the level with the upper edge of the plate, and means mounting said reflector plate on said supporting plate in spaced relation to said supporting plate.

GEORGE STEINGRUBER.